United States Patent
Brion et al.

(10) Patent No.: US 12,358,619 B2
(45) Date of Patent: Jul. 15, 2025

(54) BRAIDING

(71) Applicant: Ratier-Figeac SAS, Figeac (FR)

(72) Inventors: Patrice Brion, Lunan (FR); Pascal Amat, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 245 days.

(21) Appl. No.: 17/142,572

(22) Filed: Jan. 6, 2021

(65) Prior Publication Data
US 2021/0206481 A1    Jul. 8, 2021

(30) Foreign Application Priority Data
Jan. 8, 2020 (EP) .................................. 20290002

(51) Int. Cl.
*B64C 27/473* (2006.01)
*D04C 1/12* (2006.01)
*D04C 3/48* (2006.01)

(52) U.S. Cl.
CPC .............. *B64C 27/473* (2013.01); *D04C 1/12* (2013.01); *D04C 3/48* (2013.01)

(58) Field of Classification Search
CPC ............ B64C 27/473; D04C 1/12; D04C 3/48
See application file for complete search history.

(56) References Cited

U.S. PATENT DOCUMENTS

| | | | |
|---|---|---|---|
| 4,976,587 A * | 12/1990 | Johnston | F03D 1/0675 416/239 |
| 5,755,558 A * | 5/1998 | Reinfelder | B29C 70/302 29/889.7 |
| 5,931,076 A | 8/1999 | Ryan | |
| 8,061,253 B2 | 11/2011 | Wybrow | |
| 8,322,971 B2 | 12/2012 | Coupe et al. | |
| 10,018,175 B2 | 7/2018 | Marcoe et al. | |
| 10,443,617 B2 | 10/2019 | Finnigan et al. | |
| 10,464,850 B2 | 11/2019 | Jarmon et al. | |
| 2003/0051795 A1 | 3/2003 | Burgess | |
| 2004/0247866 A1* | 12/2004 | Jensen | E04H 12/00 428/364 |
| 2005/0042109 A1* | 2/2005 | Kovalsky | B29C 70/222 416/230 |
| 2012/0141288 A1* | 6/2012 | Gaffiero | B29C 70/202 428/113 |

(Continued)

FOREIGN PATENT DOCUMENTS

| | | |
|---|---|---|
| CN | 103240891 A | 8/2013 |
| CN | 105751528 A | 7/2016 |

(Continued)

OTHER PUBLICATIONS

European Search Report for Application No. 20290002.3, mailed Jul. 17, 2020, 8 pages.

(Continued)

*Primary Examiner* — Courtney D Heinle
*Assistant Examiner* — Ryan C Clark
(74) *Attorney, Agent, or Firm* — CANTOR COLBURN LLP (57) ABSTRACT

A method of applying a braided cover to a core comprises braiding a plurality of tows around the core from a plurality of bobbins. One or more properties of the tow on a respective bobbin vary along the length of the tow.

11 Claims, 12 Drawing Sheets

(56) References Cited

U.S. PATENT DOCUMENTS

| | | | |
|---|---|---|---|
| 2013/0152772 A1* | 6/2013 | Masson | B29C 70/222 |
| | | | 87/9 |
| 2014/0033906 A1* | 2/2014 | Erlendsson | D07B 5/00 |
| | | | 87/8 |
| 2015/0066081 A1* | 3/2015 | Martin | D04B 21/202 |
| | | | 606/228 |
| 2015/0143981 A1* | 5/2015 | Dunker | D04C 1/12 |
| | | | 87/8 |
| 2017/0036759 A1* | 2/2017 | Sutton | B64C 27/473 |
| 2018/0127088 A1* | 5/2018 | Amat | B32B 5/18 |
| 2018/0162092 A1 | 6/2018 | Tsotsis et al. | |
| 2018/0334913 A1* | 11/2018 | Le Meur | B29C 70/70 |
| 2018/0368510 A1 | 12/2018 | O'Haire et al. | |
| 2018/0371651 A1* | 12/2018 | Yoshikawa | D03D 15/56 |
| 2020/0047879 A1* | 2/2020 | Foskey | B64C 27/473 |
| 2020/0141032 A1* | 5/2020 | Yoshikawa | B29B 15/10 |
| 2020/0247561 A1* | 8/2020 | Rivera | B28B 1/001 |
| 2020/0400025 A1* | 12/2020 | Sjostedt | B29C 70/521 |

FOREIGN PATENT DOCUMENTS

| | | | | |
|---|---|---|---|---|
| DE | 102008052667 B3 | 6/2010 | | |
| DE | 102010047193 A1 | 4/2012 | | |
| DE | 102015209535 A1 | 11/2016 | | |
| EP | 2206597 B1 | 2/2019 | | |
| WO | WO-2004001115 A1 * | 12/2003 | | B29C 37/0064 |

OTHER PUBLICATIONS

Chinese Office Action for CN Application No. 202110024692.3, dated Nov. 5, 2024, pp. 1-7.

* cited by examiner

FIG. 12

BRAIDING

FOREIGN PRIORITY

This application claims priority to European Patent Application No. 20290002.3 filed Jan. 8, 2020, the entire contents of which is incorporated herein by reference.

TECHNICAL FIELD

The present disclosure relates to applying braided covers to articles such as, for example propeller blades

BACKGROUND

Propeller blades typically comprise a core around which is braided a fibre cover. The cover may comprise fibres such as carbon fibres, glass fibres and so on. After braiding, the braided covering may be impregnated with resin and cured to form a braided covering.

Figure 1:
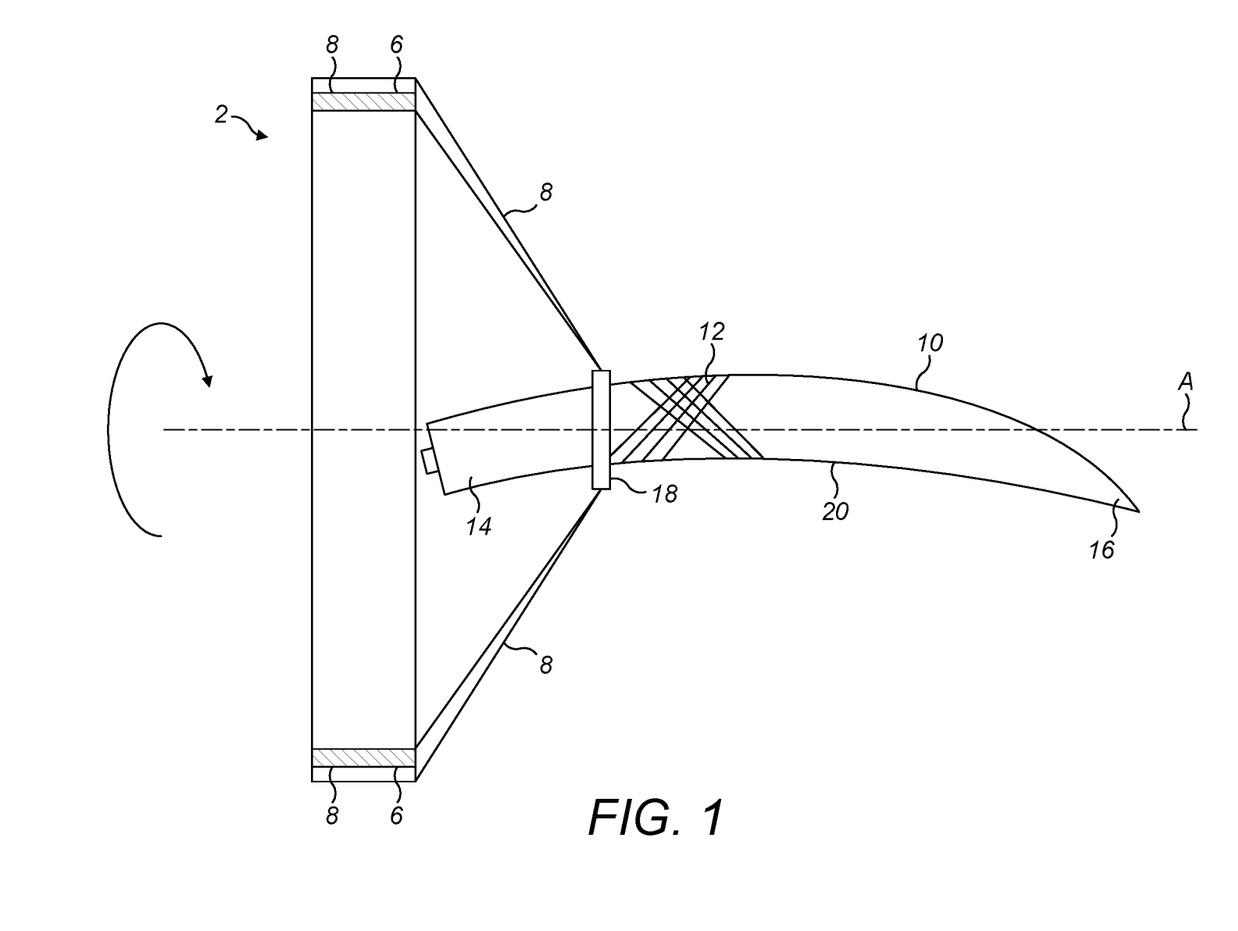
FIG. 1 illustrates, schematically, a braiding machine.

Typically the braiding is applied using a braiding machine which is shown schematically in FIG. 1. The braiding machine 2 comprises a frame 4 which supports a number of bobbins 6 carrying braiding tows 8. The braiding tows 8 are wound around a core 10 to form a braided cover 12 on the core 10. In this example, the core 10 is a propeller blade core which extends from a root region 14 to a tip region 16. However, this is merely exemplary and the core 10 may have some other shape or application. A braiding ring 18 supports the tows 8 close to the core 10 just before they are braided onto the core 10. The core 10 is moved in an axial direction X and the bobbins 6 are rotated about the axis A of the machine so as to deposit the braided cover 12 onto the core 10. Such machines are well known in the art, being supplied by manufacturers such as Spiraltex, Eurocarbon BV and Herzog GmbH, and need not therefore be described further.

Different types of braiding may be produced. For example, in a bi-bias braid, two sets of tows may be laid down, at +/−45° to the axial direction. In a triaxial braiding, three sets of tows may be laid down, for example at +/−45° and 0° to the axial direction. In interlock braiding, a link may be formed between several braid lay-ups through the thickness of the braiding, with a tow extending through several layers of braiding.

Figure 2:
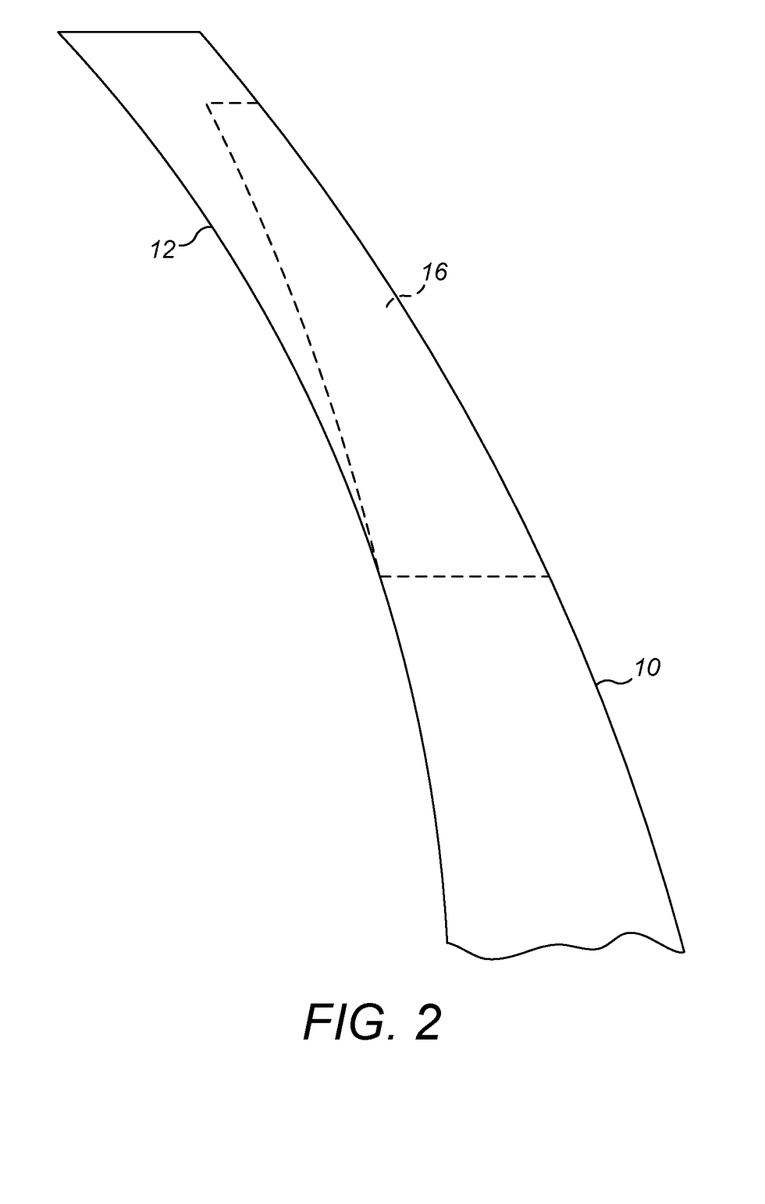
FIG. 2 illustrates, schematically a braided cover applied to a core by the machine of FIG. 1.

A problem arises, however, when applying a cover 12 to a variable perimeter core, such as a propeller blade core 10, particularly in the tip region 16 of the blade core 10. The tow configuration applied to the core 10 is a compromise between providing adequate coverage of the cover 12 and the minimum diameter of cover which can be applied. This means that, as shown schematically in FIG. 2, the braided cover 12 may not closely follow the shape of the core tip region 16. This means that at the tip region 16, there is excess braid material which has to be cut in order to closely engage the core 10, meaning that there is a discontinuity in the cover fibres in this region. This is not only undesirable from a perspective of the strength and integrity of the braiding, but also in terms of cost.

SUMMARY

From a first aspect, the disclosure provides a method of applying a braided cover to a core. The method comprises braiding a plurality of tows around the core from a plurality of bobbins. One or more properties of the tow on a respective bobbin vary along the length of the tow. This will permit the properties of the deposited tows to vary in the finished braiding.

The disclosure also provides a bobbin for use in a braiding process. The bobbin comprises a fibre tow wound thereon. One or more properties of the tow vary along the length of the tow.

In embodiments of either of the above, the property may include the diameter of the tow.

In embodiments of any of the above, the property may include the material of the tow.

In embodiments of any of the above, the property may include the number of fibres in the tow.

In embodiments of any of the above, the property may include the linear weight of the tow.

In embodiments of any of the above, the property may include the shape or configuration of the tow.

In embodiments of any of the above, the tow may comprise tow sections having different properties and the tow sections may be joined together, for example by one or more of thermal bonding, knotting or winding.

In embodiments of any of the above, the position and/or nature of the variation in properties of a tow on one bobbin may be different from a position and/or nature of a variation in properties of a tow on another bobbin.

In embodiments of the above, the position and/or nature of the variation in properties of tows deposited in one direction may be is different from a variation in position and/or nature in properties of tows deposited in another direction.

In embodiments of any of the above, the variation in properties of tows on different bobbins may be staggered such that the properties of the deposited braided cover transition gradually from one property to another.

In embodiments of any of the above, the properties of the tow (8) may be adapted to the position of deposition of the tow on the core.

In embodiments of any of the above, the core may be the core of a propeller blade and the number of fibres in the tow, the tow diameter or the linear weight of the tow may decrease towards a tip region of the core.

The disclosure also provides a propeller blade comprising a core and a braided cover applied to the core by any method in accordance with the disclosure.

The disclosure also provides a propeller blade comprising a core and a braided cover applied to the core. The braided cover comprises a plurality of braided tows, and a property of at least one of the tows varies along a length of the core.

Optionally the core may extend from a base region to a tip region and the diameter of one or more tows, the number of fibres in one or more tows or the linear weight of one or more tows may decrease towards the tip region of the core.

In embodiments of the propeller blade, the properties of a plurality of tows may vary along a length of the core. Optionally the properties of different tows may vary differently from one another so as to provide a gradual transition in the properties of the braided cover along a length of the core.

DETAILED DESCRIPTION

As discussed in the Background section, a braided cover 12 is applied to a core 10 by winding tows 8 from bobbins 6 around a core 10. In known braiding processes, the properties of the tow 8 on any bobbin 6 do not vary along the length of the tow 8. This leads to potential problems as also discussed in the Background section.

Figure 3:
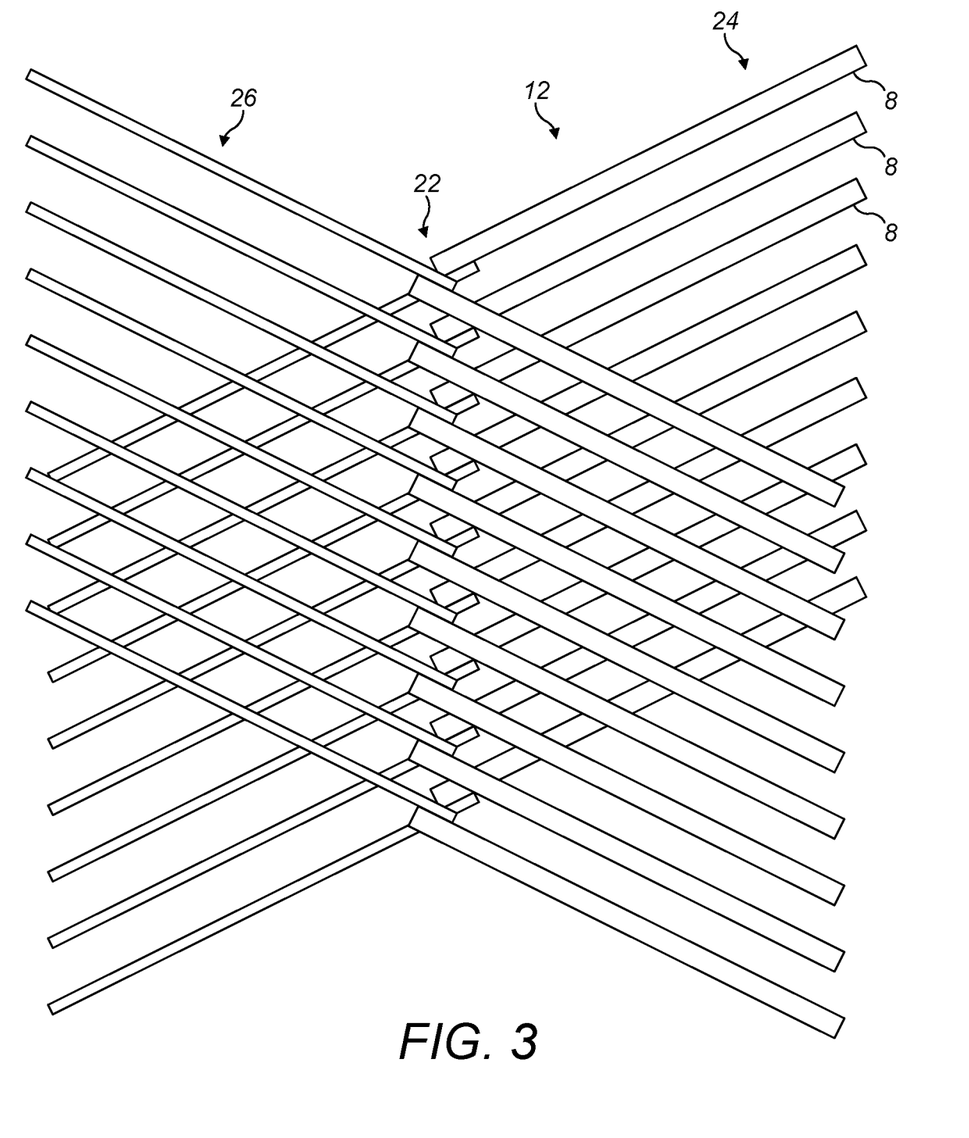
FIG. 3 illustrates a bi-bias braiding configuration in accordance with the disclosure.

In accordance with the present disclosure, however, the properties of the tow 8 on one or more bobbins 6 vary along the length of the tow 8. This allows the properties of the applied braided cover 12 to be varied along the length of the core 10. In this way, the properties of the braided cover 12 can be tailored to the particular position on the core 10, as will be discussed further below. FIG. 3 illustrates a bi-bias braided cover 12 having a plurality of tows 8 each applied from a separate bobbin 6. The tows are applied in groups 8A, 8B, each in a different direction, for example at +/−45° to the axial direction. There is a transition region 22 between regions 24, 26 of the braided cover 12 having different properties.

The position at which the tow property changes within a tow 8 on a bobbin 6 can be correlated with the desired position on the core 10 where the property of the applied braided cover 12 will change, as the path of deposition of the tows 8 on the core will be known.

Various tow properties may vary on any tow 8. The variation in property may be chemical or physical.

Thus in some embodiments, the tow 8 may comprise fibres of different chemical compositions at different positions along its length. For example, the chemical composition of the tows 8 may be chosen to provide a desired strength characteristic. Typical materials which may be used include Kevlar fibres, carbon fibre (HR, IM or HM for example) and glass fibres. The tow material may also be chosen to provide a desired electrical conductivity, in which case metallic fibres could also be used. Fibres of different compositions may be used together at various positions along the tow 8.

The property may also be the presence or absence of a particular element such as a binder or sizing on the tow 8.

The physical properties of the tow 8 which may vary along the tow length include, the tow diameter, the number of fibres in the tow or the linear weight of the tow. The shape of the tow 8, for example its twist or texturing, may also vary.

In an embodiment as illustrated in FIGS. 1 and 13 for example, the properties of the tow 8 may be chosen such that there is a close fit of the braiding along the length of the propeller core 10. Thus, for example in a base region of the core 10, the tow diameter, the number of fibres in the tow or the linear weight of the tow may be relatively low in the base region 14 of the core, increase in the mid span region 20 of the core 10 where the perimeter of the core 10 is larger and decrease once more towards the tip region 16 where the perimeter is smaller. Thus in general terms, the tow diameter, the number of fibres in the tow 8 or the linear weight of the tow 8 may vary proportionally in relation to the core perimeter.

The properties of the tow 8 can be varied by using fibres or fibre bundles of different properties, suitably joined together. FIGS. 4 to 8 illustrate various methods of joining two such fibres or fibre bundles together.

Figure 4:
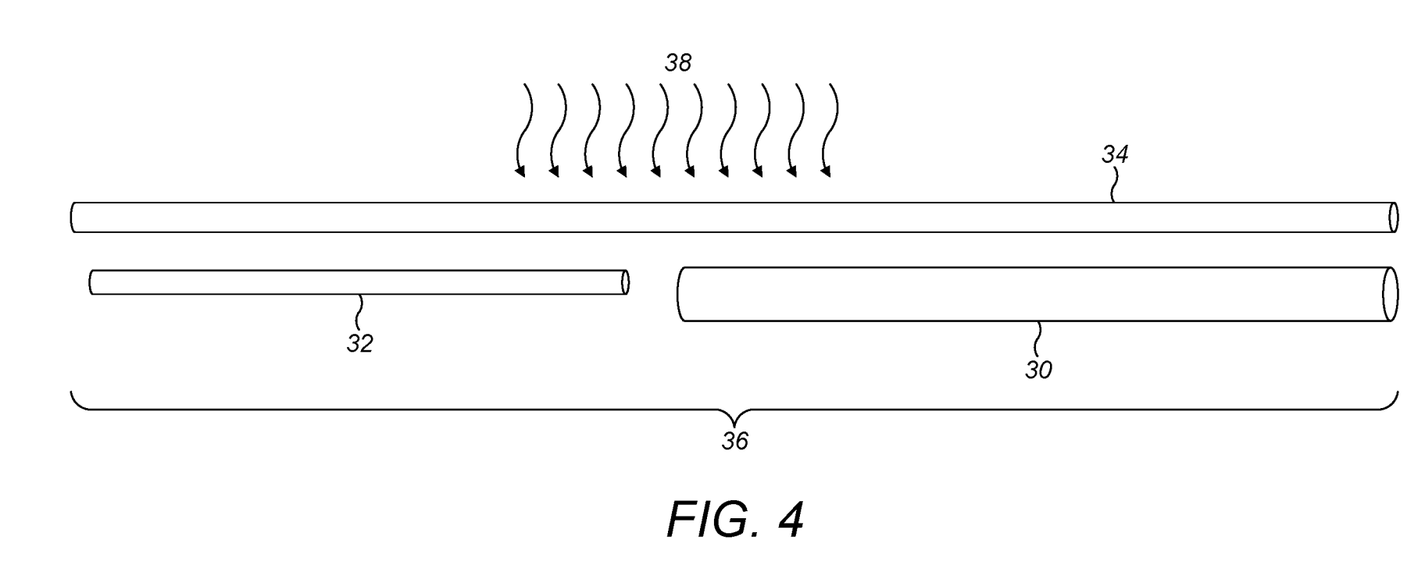
FIG. 4 illustrates schematically a first method of joining different tow configurations.

In the embodiment of FIG. 4, a first fibre tow 30 having first properties is joined to a second fibre tow 32 having second properties. As illustrated the first tow and the second tow 32 have different diameters, but the different properties may be any of those discussed above. The first tow 30 and second tow 32 are joining thermally. A thermoplastic fibre 34 is welded to the first and second tows 32, 34 over an overlap 36 using a heat source 38 so as to join the first tow 30 and second tow 32 and fibre 34 together. This method may be particularly suitable for joining fibres which are not themselves fusible at relatively low temperatures, for example carbon fibres.

Figure 5:
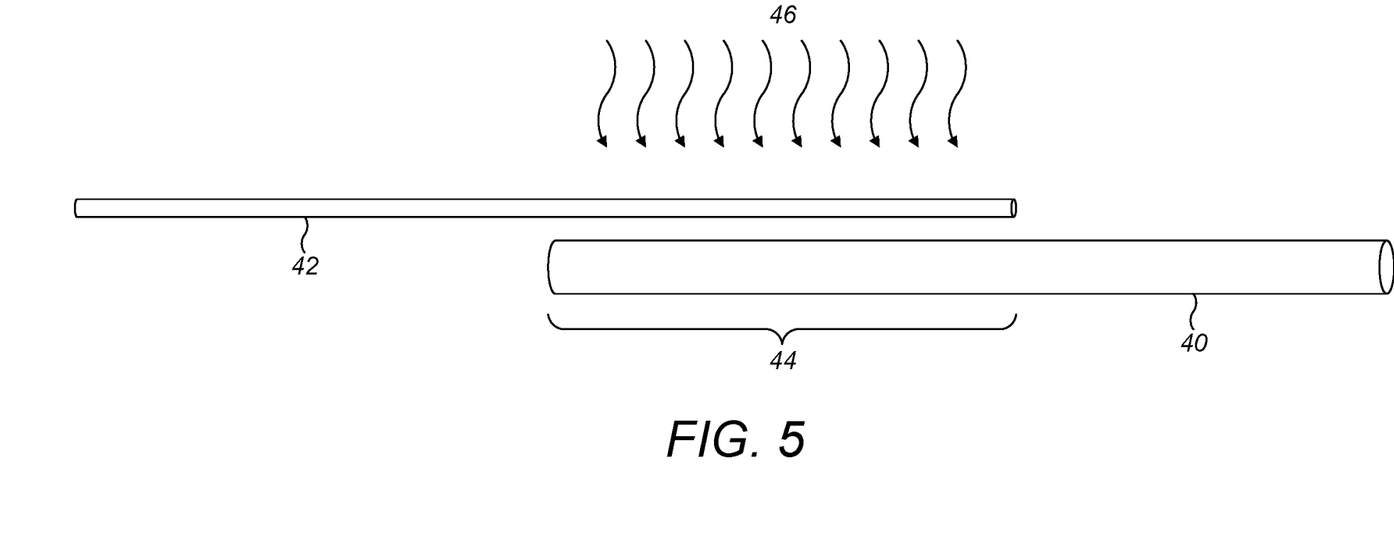
FIG. 5 illustrates schematically a second method of joining different tow configurations.

In the embodiment of FIG. 5, a first fibre tow section 40 having first properties is joined to a second fibre tow section 42 having second properties. As illustrated the first tow section 40 and the second tow section 42 have different diameters, but the different properties may be any of those discussed above. The first tow section 40 and second tow section 42 are also joined thermally at an overlap 44 by welding using a heat source 44. To facilitate the welding process, the first tow section 40 and/or second tow section 42 may be provided with thermoplastic fibres incorporated into their structure and/or have a thermoplastic binder applied thereto. These will melt under the heat applied by heat source 46 to join the first tow section 40 and second tow section 42 together.

Figure 6:
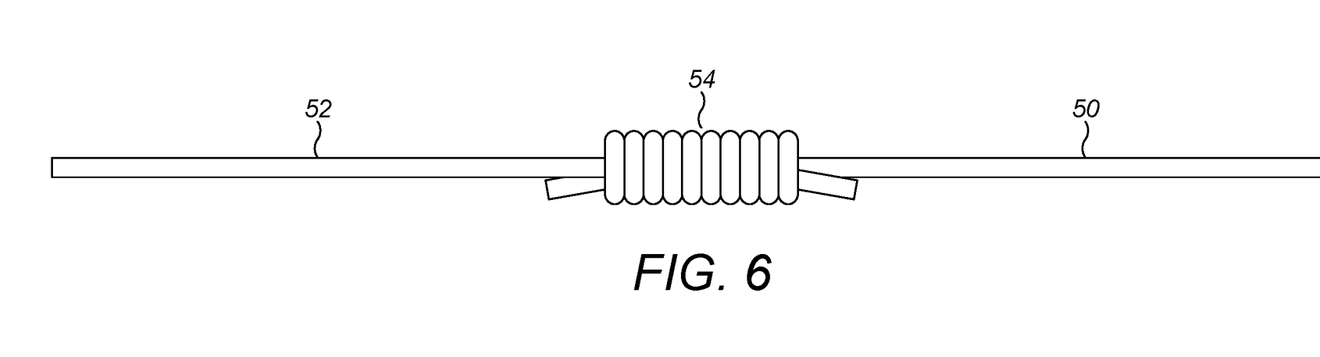
FIG. 6 illustrates schematically a third method of joining different tow configurations.

In the embodiment of FIG. 6, a first fibre tow section 50 having first properties is joined mechanically to a second fibre tow section 52 having second properties. As illustrated the first tow section 50 and the second tow section 52 have the same diameter but are of different materials. For example, the first tow section 50 may be of Carbon IM and the second tow 52 of Carbon HM. However, the different properties may be any of those discussed above. The first tow section 50 and second tow section 52 are joining in this embodiment by a knot 54 formed between the ends of the first and second tow sections 50, 52. This method of joining may suit tows in which the tow diameters are generally similar.

Figure 7:
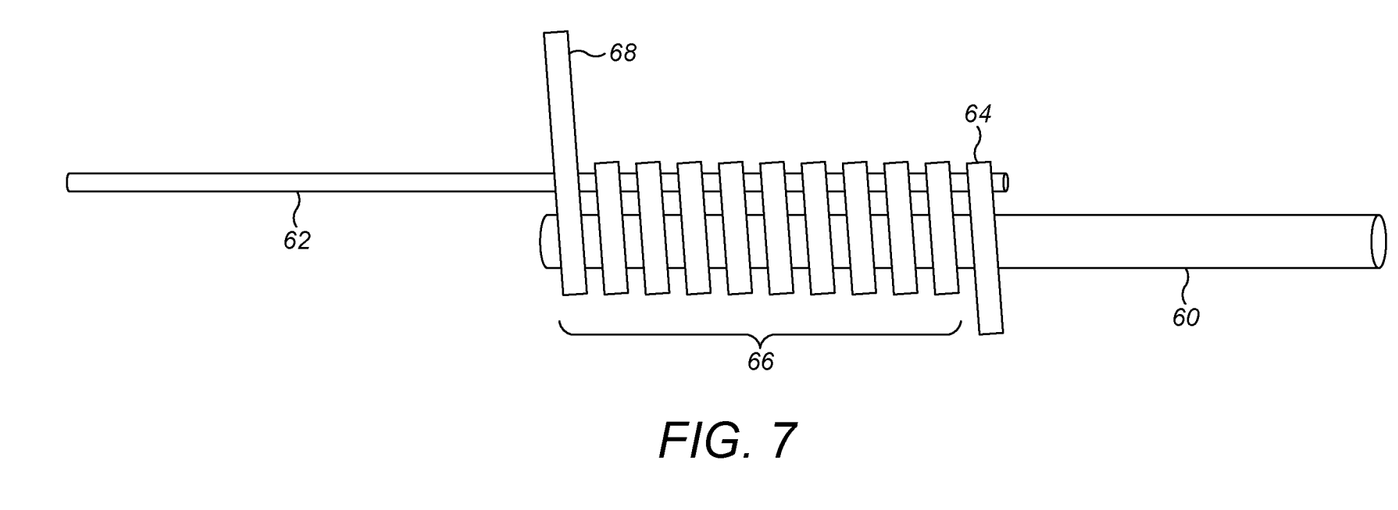
FIG. 7 illustrates schematically a fourth method of joining different tow configurations.

In the embodiment of FIG. 7, a first fibre tow section 60 having first properties is also joined mechanically to a second fibre tow section 62 having second properties. As illustrated the first tow section 60 and the second tow section 62 have different diameters, but the different properties may be any of those discussed above. In this embodiment the first tow section 60 and second tow section 62 are joining by a fibre 64 wrapped around a region 66 of overlap between the first tow section 60 and second tow section 62. The ends 68 of the wrapping fibre 64 may be suitably secured to the first and second tow sections 60, 62. The wrapping fibre 64 may be adhesively secured to the first and second tow sections 60, 62 in some embodiments.

The first and second tow sections may be joined to one another in other manners, for example adhesively, or by a combination of any of the techniques discussed above.

Figure 8:
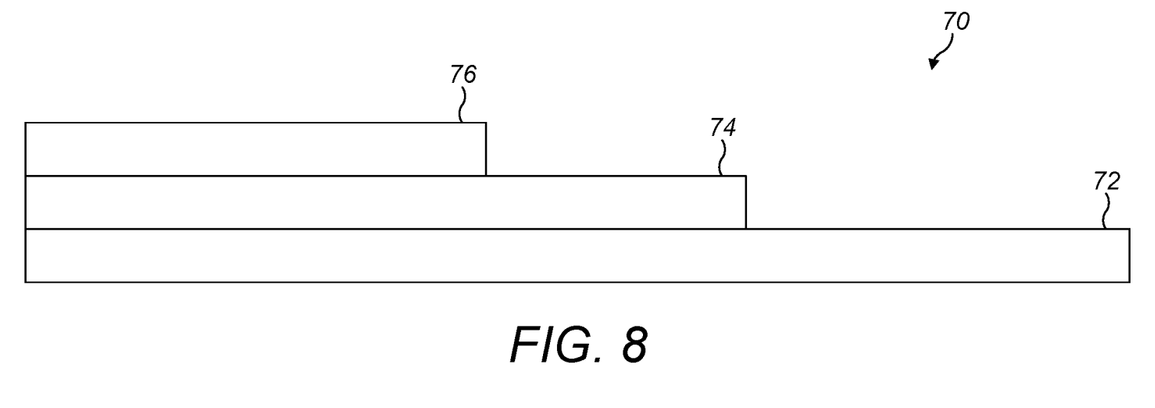
FIG. 8 illustrates a tow having a varied tow property.

As discussed above, the property of the tow 8 which is varied may be the number of fibres in the tow 8. FIG. 8 illustrates such an embodiment.

In FIG. 8, a tow 70 comprises a base tow 72, an intermediate tow 74 and a top tow 76. The thickness of the tow 70 therefore increases along the length of the tow 70. The respective tows 72, 74, 76 may be joined to one another using the techniques discussed above, for example.

The discussion so far has focussed on the properties of individual tows 8 in the braiding 12. In some embodiments, the properties of the tows 8 on the individual bobbins 6 may be the same such that, for example, the properties of the braiding 12 change at a predetermined position on the core 10 where the changes in properties of the individual tows 8 align. This may, as illustrated in FIG. 3 create a relatively sharp transition region 24 in the braided cover 12. While this may be acceptable in many applications, in some applications it may not be desirable to have an abrupt change in the properties of the braiding 12. In such applications, it may be desirable to stagger the position of the change in properties of the tows 8 on the individual bobbins 6 such that there may be a more gradual transition in the properties of the applied braiding 12. The position of the change in tow properties may be varied in adjacent or non-adjacent tows so as to provide a more gradual transition in properties of the braided cover 12. Also, the positions of the change in tow properties may be varied in tows laid in just one direction (for example +45°) and remain the same in tows laid in another direction (for example −45° or 0°). In a yet further arrangement, the position of the change in tow properties may vary in tows laid in different positions. Examples of the various exemplary arrangements are shown in FIGS. 9 to 12. The nature of the variation in tow properties may also vary between tows or different groups of tows.

Figure 9:
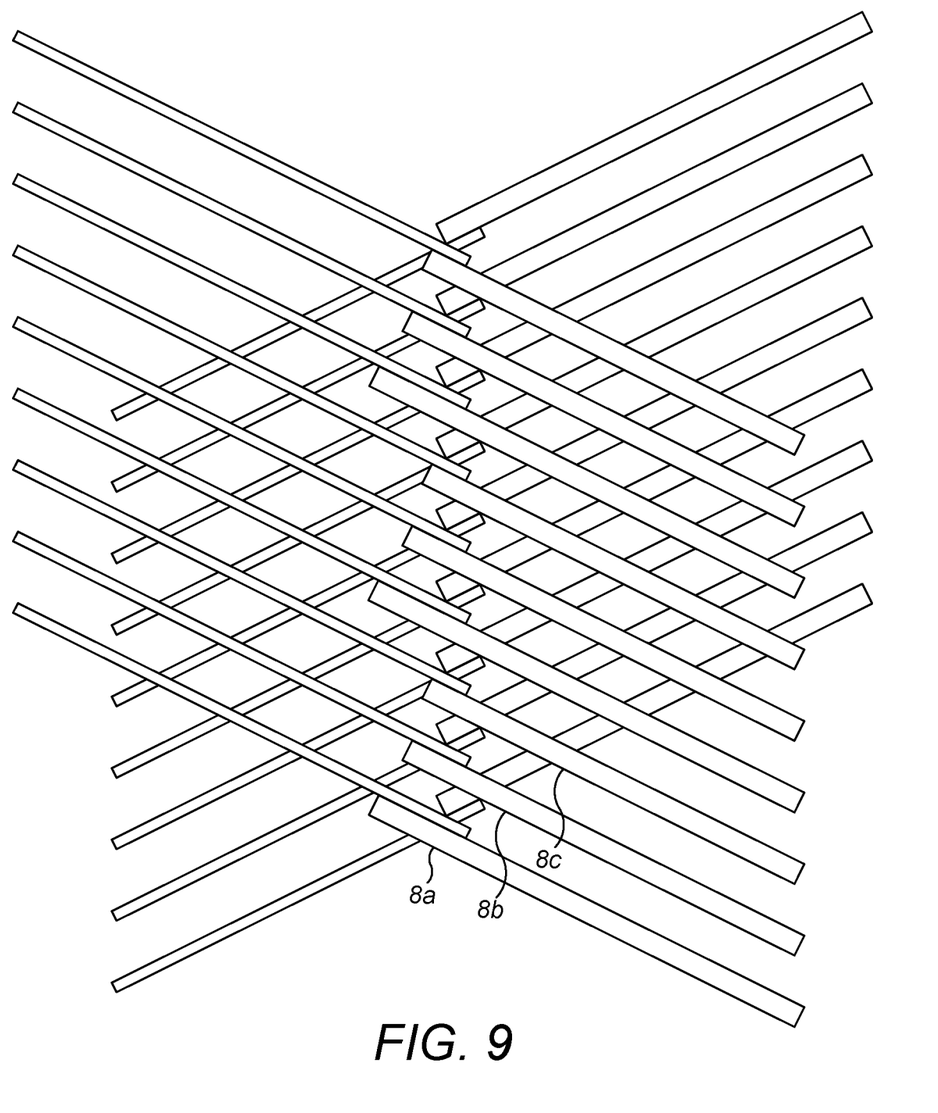
FIG. 9 shows a further braiding configuration in accordance with the disclosure.

In the embodiment of FIG. 9, the position of the change in tow properties varies between tows 8a, 8b, 8c laid in both directions in a bi-bias braiding.

Figure 10:
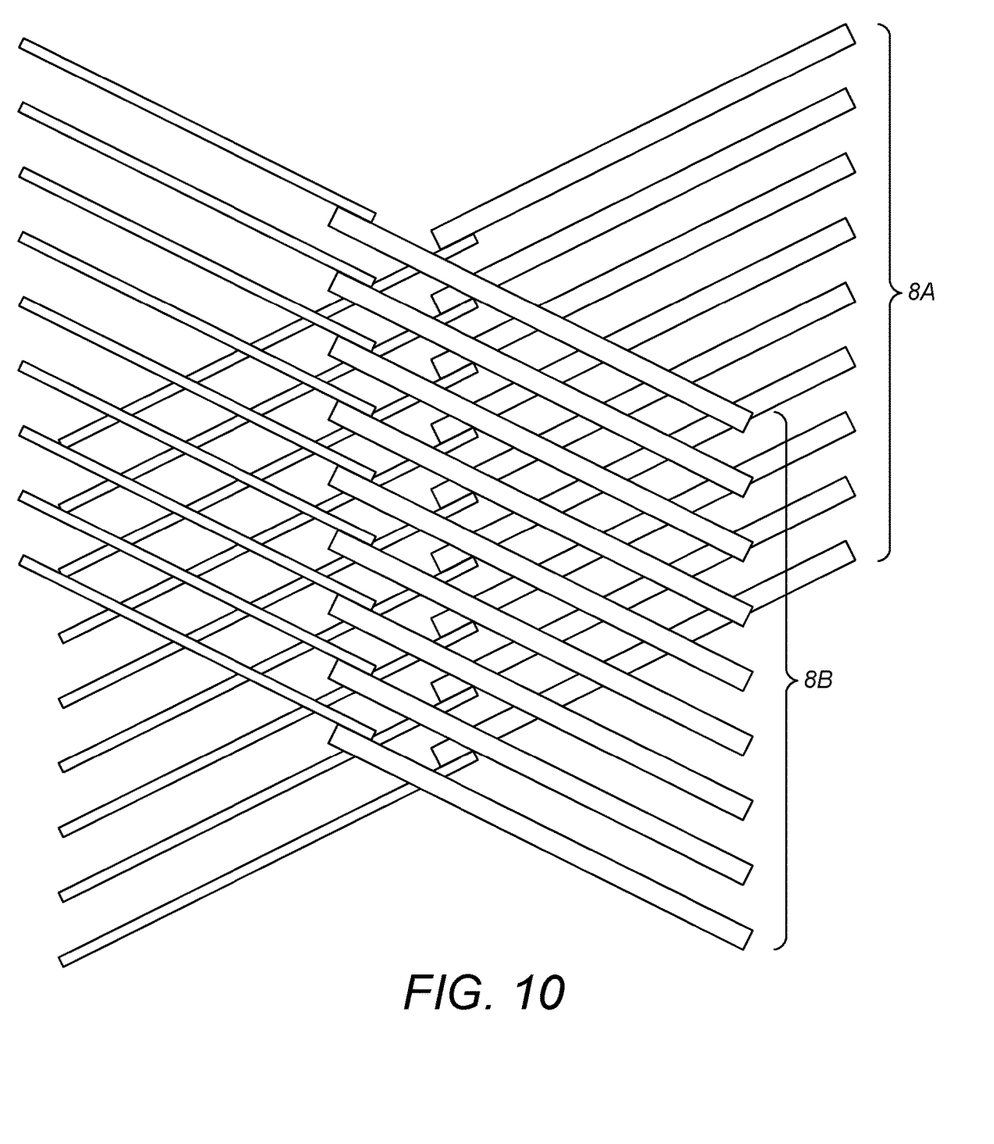
FIG. 10 shows a yet further bi-bias braiding configuration in accordance with the disclosure.

In the embodiment of FIG. 10, the position of the change in tow properties is substantially constant within each group 8A, 8B of tows laid in a given direction, but varies between the groups 8A, 8B.

Figure 11:
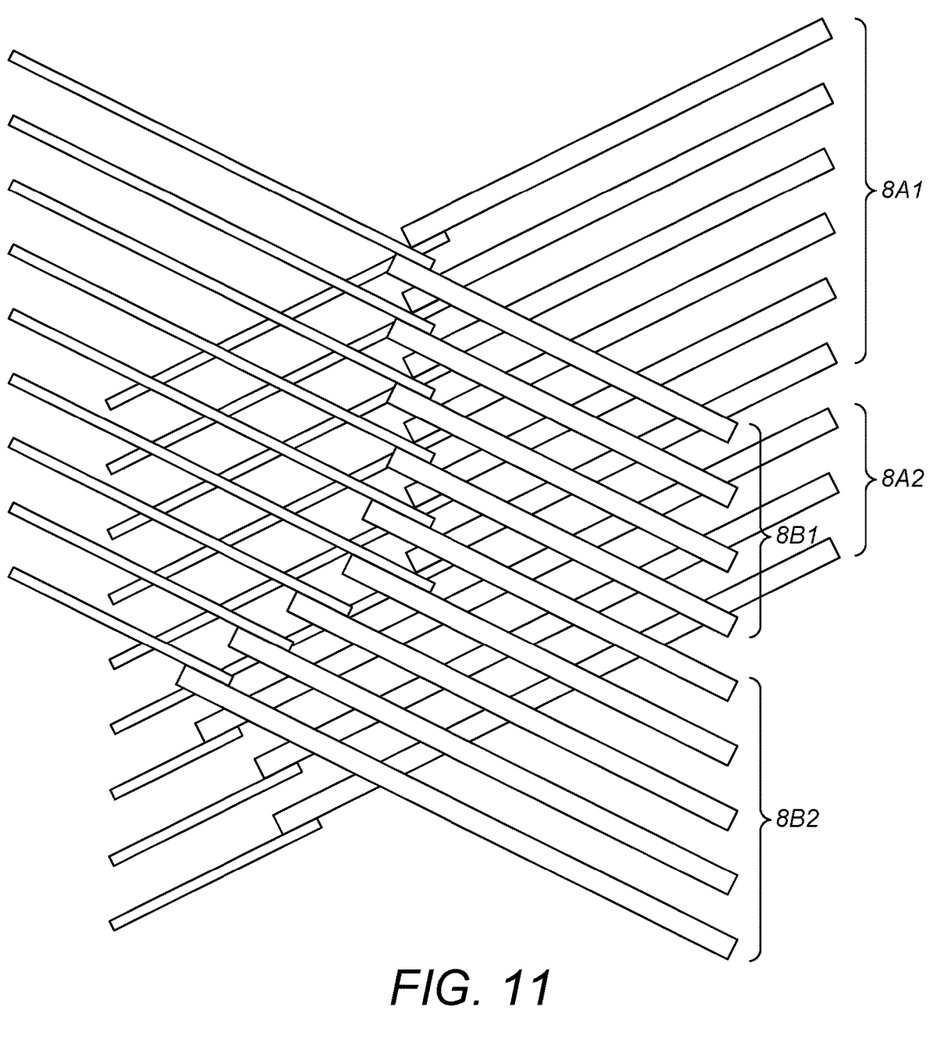
FIG. 11 shows a yet further bi-bias braiding configuration in accordance with the disclosure.
Figure 12:
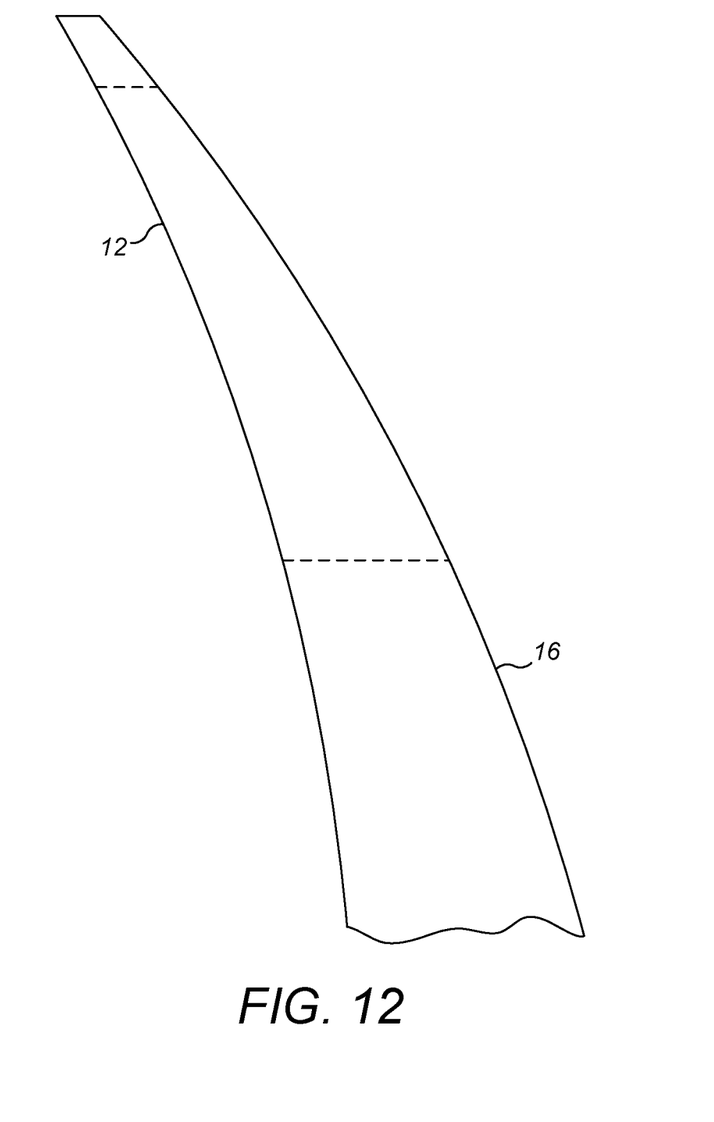
FIG. 12 illustrates, schematically a braided cover applied to a core in accordance with the disclosure.

In the embodiment of FIG. 11, the position of the change in tow properties varies within each group 8A, 8B laid in a given direction. In this embodiment, the position of change of properties is the same within sub-groups 8A1 and 8B1, but varies within subgroups 8A2 and 8B2. Other variations may of course be possible.

It will be seen that embodiments of the disclosure provide improved braiding 12 which may better fit a core 10 due to variations in one or more the properties of the tows 8 making up the braiding 12 along the lengthy of the tow 8. In the context of a propeller blade for example, a smaller tow diameter at the tip region 16 may allow the tow 8 more closely to cover the perimeter of the tip region 16, avoiding the need for cutting the braiding in this region in order to make it fit the core 10. This may be advantageous from both structural and cost perspectives. This is illustrated by the difference between FIGS. 2 and 12.

It will be understood that the above is a description of some exemplary embodiments of the disclosure and that modifications may be made thereto without departing from the scope of the disclosure. For example, while specifically discussed in the context of bi-bias braiding, the disclosure also applied to other types of braiding such as triaxial braiding and interlock braiding. For example in the context of a triaxial braiding, certain tows, for example the axial (0°) tows may have a variation in properties, while other tows (for example the angled (for example +/−45° tows) may have no variation in properties.

In addition while the embodiments illustrated show variations in tows deposited in different directions, in certain embodiments, only tows deposited in one direction may have a variation in properties.

While the disclosure has been exemplified in the context of braiding covers on propeller blades, it is not limited to such and may find application in the braiding of covers on other components, particularly ones having a variable perimeter. These may include, for example, fuel lines, landing gear, drive shafts and hydraulic actuators.

The invention claimed is:

1. A method of applying a braided cover to a core, the method comprising:
   braiding a plurality of tows around the core from a plurality of bobbins to form the braided cover,
   wherein one or more properties of the tow on a respective bobbin varies along the length of the tow;
   wherein the core is the core of a propeller blade and the number of fibres in the tow, the tow diameter or the linear weight of the tow decreases towards a tip region of the core;
   wherein the variation of the one or more properties of the tow on a respective bobbin along the length of the tow has the result that the properties of the braided cover are tailored to a particular position on the core and there is no excess braided cover along the length of the propeller core.

2. A method as claimed in claim 1, wherein the tow is formed by joining fiber with different diameters together to vary a diameter of the tow.

3. A method of claim 1, wherein the tow is formed by joining fibres with different materials.

4. A method of claim 1, wherein the tow comprises tow sections having different properties and the tow sections are joined together by one or more of thermal bonding, knotting or winding.

5. A method of claim 1, wherein a position or nature of a variation in properties of a tow on a first bobbin is different from a position or nature of a variation in properties of a tow on a second bobbin.

6. A method as claimed in claim 5, wherein the position or nature of the variation in properties of tows deposited in one direction is different from a variation in position and/or nature in properties of tows deposited in another direction.

7. A method as claimed in claim 5, wherein the variation in properties of tows on different bobbins is staggered such that the properties of the deposited braided cover transition gradually from one property to another.

8. A method of claim 1, wherein the properties of the tow are adapted to the position of deposition of the tow on the core.

9. A method as claimed in claim 1 wherein the variation of the diameter of the tow on a respective bobbin along the length of the tow has the result that the need to cut the braiding in the tip region of the core is avoided.

10. A method as claimed in claim 1 wherein the properties of each tow are chosen such that there is a close fit of the braiding along the length of the propeller core.

11. A method as claimed in claim 10, wherein the core is a variable perimeter core, and wherein the core has along its length a base region, a mid span region, and a tip region, wherein in the base region of the core one or more of the tow diameter, the number of fibres in the tow or the linear weight of the tow in the braided cover are relatively low compared to the mid span region, wherein in the mid span region of the core where the perimeter of the core is larger than the perimeter of the core in the base region one or more of the tow diameter, the number of fibres in the tow or the linear weight of the tow in the braided cover is increased relative to the base region, and wherein in the tip region of the core where the perimeter is smaller than the perimeter of the core in the mid span region one or more of the tow diameter, the number of fibres in the tow or the linear weight of the tow is decreased relative to the mid span region.

* * * * *